United States Patent
Sogabe et al.

(10) Patent No.: US 10,245,697 B2
(45) Date of Patent: Apr. 2, 2019

(54) METHOD FOR CONTROLLING TEMPERATURE ADJUSTMENT SYSTEM OF MACHINE

(71) Applicant: Okuma Corporation, Niwa-Gun (JP)

(72) Inventors: Eisuke Sogabe, Niwa-Gun (JP); Seiei Yamamoto, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 709 days.

(21) Appl. No.: 14/881,483

(22) Filed: Oct. 13, 2015

(65) Prior Publication Data
US 2016/0121445 A1    May 5, 2016

(30) Foreign Application Priority Data

Oct. 29, 2014 (JP) ................. 2014-220533
Jun. 8, 2015 (JP) ................. 2015-115990

(51) Int. Cl.
*B23Q 11/12* (2006.01)
*G05B 19/18* (2006.01)

(52) U.S. Cl.
CPC .......... *B23Q 11/127* (2013.01); *G05B 19/18* (2013.01); *G05B 2219/34306* (2013.01); *Y02P 70/163* (2015.11); *Y02P 70/169* (2015.11)

(58) Field of Classification Search
CPC ............ B23Q 11/127; G05B 19/18; G05B 2219/34306; Y02P 70/169; Y02P 70/163
See application file for complete search history.

(56) References Cited

U.S. PATENT DOCUMENTS

| 2003/0079485 | A1 | 5/2003 | Nakata | |
| 2010/0319903 | A1* | 12/2010 | Sugimoto | B23Q 11/148 165/287 |
| 2012/0165971 | A1* | 6/2012 | Murahashi | B23Q 11/0007 700/175 |
| 2013/0211598 | A1* | 8/2013 | Fujii | G05B 19/404 700/275 |
| 2016/0334779 | A1* | 11/2016 | Takeno | G05B 19/404 |

FOREIGN PATENT DOCUMENTS

JP    2001-165058 A1    6/2001

* cited by examiner

*Primary Examiner* — Nathan L Laughlin
(74) *Attorney, Agent, or Firm* — Burr & Brown, PLLC

(57) ABSTRACT

A method for controlling a temperature adjustment system of a machine tool is provided. With the method, a temperature rise value $\Delta T_k$ of a main spindle device after stopping of rotation of a main spindle is obtained by using a reference temperature measured by a machine body temperature sensor mounted in a portion other than the main spindle device of a machine tool to calculate an estimated temperature $y_k$. Therefore, as compared to a conventional method based only on a temperature of a cooling medium, supply of the cooling medium by a cooling device can be stopped or an operation of the cooling device can be switched from a first mode to a second mode without deteriorating machining accuracy in the main spindle device, thereby efficiently reducing power consumption.

15 Claims, 10 Drawing Sheets

METHOD FOR CONTROLLING TEMPERATURE ADJUSTMENT SYSTEM OF MACHINE

BACKGROUND OF THE INVENTION

This application claims the benefit of Japanese Patent Application Number 2014-220533 filed on Oct. 29, 2014 and Japanese Patent Application Number 2015-115990 filed on Jun. 8, 2015, the entirety of which is incorporated by reference.

FIELD OF THE INVENTION

The present invention relates to a method for controlling a temperature adjustment system that adjusts a temperature of a medium having a temperature to be adjusted. The medium having a temperature to be adjusted is supplied to a rotating device, a table, or the like that is mounted to, for example, a machine tool.

DESCRIPTION OF THE BACKGROUND ART

Examples of a temperature adjustment system for a machine tool include a cooling system for a main spindle device mounted to a machine tool. That is, in the main spindle device, rotation of a main spindle causes heat generation in, for example, bearings for the main spindle and a motor that rotates the main spindle, so that the main spindle is heated. If the generated heat is left as it is, thermal displacement may occur in the main spindle due to rise in temperature, thereby leading to deterioration of machining accuracy. To date, a main spindle device provided with, for example, a cooling system for a main spindle as shown in FIG. 1, has been used. In the main spindle device, a cooling medium is collected, cooled again by a cooling device, and resupplied, so that a main spindle device 1 is cooled. That is, in the main spindle device 1, which has a main spindle 4 rotatably supported via a plurality of bearings 3, 3 ... in a housing 2, cooling flow paths 5, 5 are provided in, for example, an outer cylinder portion of the housing 2 such that a cooling medium flows through the cooling flow paths 5, 5. By the cooling medium that flows through the cooling flow paths 5, 5, heat generated in the bearings 3, 3 ..., a motor 6, and the like is reduced.

Further, in general, in a machine tool in a standby state, a large amount of electric power is consumed in peripheral devices thereof. In particular, the ratio of power consumption in the cooling system to the overall power consumption is high. Therefore, in order to reduce power consumption in the cooling system, a method for controlling the cooling system as described in, for example, Japanese Patent Application Publication No. 2001-165058 (JP 2001-165058 A) has been suggested. In the control method described in JP 2001-165058 A, for example, the temperature of a cooling medium to be supplied to a cooling flow path and the temperature of the cooling medium to be collected from the cooling flow path are monitored. When it is determined, based on the result of the monitoring, that, for example, the machine tool is at a stop, an amount of the cooling medium supplied from a cooling device is reduced, thereby reducing power consumption.

SUMMARY OF THE INVENTION

In the main spindle device 1 having the cooling flow paths 5, 5 provided in the outer cylinder portion as described above, after the main spindle 4 is stopped, a difference between a temperature of the cooling medium supplied to the cooling flow paths 5, 5 and a temperature of the cooling medium collected from the cooling flow paths 5, 5 has been sufficiently reduced, and the supply of the cooling medium from the cooling device is stopped. Then, change of the temperature of the bearings 3, 3 ... of the main spindle device 1 is measured. The result of the measurement is shown in FIG. 2. As is apparent from FIG. 2, even after the difference in temperature is sufficiently reduced, the heat in the main spindle is not sufficiently removed, and the temperature of the bearings 3, 3 ... greatly rises. That is, when the supply of the cooling medium is stopped, thermal displacement occurs in a structural member such as a rotating portion in the main spindle device 1, whereby machining accuracy may not be stabilized. Therefore, with the method as described in JP 2001-165058 A in which the temperature of the cooling medium is monitored, an electric power supply for the cooling device cannot be disconnected, and power consumption cannot be effectively reduced.

The present invention is made in view of the above problem, and an object of the present invention is to provide a method for controlling a temperature adjustment system of a machine tool, which allows efficient reduction of power consumption and reduction of thermal displacement or the like in a structural member, and consequently contributes to highly accurate machining.

In order to attain the above-mentioned object, a first aspect of the present invention is a method for controlling a temperature adjustment system of a machine tool, and the temperature adjustment system includes a medium supply and collection device for supplying, a medium having a temperature to be adjusted, to a structural member of the machine tool, and collecting, the medium having a temperature to be adjusted, from the structural member, and a temperature adjusting device for adjusting a temperature of the medium having a temperature to be adjusted. The method includes a first step, a second step and a third step. The first step is a step of measuring a structural-member temperature that is a temperature near a first portion in the structural member, and measuring a reference temperature that is a temperature of a second portion in the machine tool, and obtaining a temperature change value based on the structural-member temperature and the reference temperature, after stopping of a machining operation that causes temperature change of the medium having a temperature to be adjusted. The first portion contributes to temperature change of the medium having a temperature to be adjusted and is deformed due to the temperature change of the medium having a temperature to be adjusted. The second portion is not involved in the temperature change of the medium having a temperature to be adjusted, and is not deformed due to the temperature change of the medium having a temperature to be adjusted. The second step is a step of obtaining an estimated temperature of the first portion based on the temperature change value. The third step is a step of determining, based on the estimated temperature, whether or not at least one of an operation of the temperature adjusting device and an operation of the medium supply and collection device is stopped, or whether or not at least one of an operation of the temperature adjusting device and an operation of the medium supply and collection device is switched from a first mode representing a normal operation to a second mode in which power consumption is less than that in the first mode.

In a second aspect of the present invention based on the first aspect, in the second step, the estimated temperature is obtained by using the temperature change value and a coefficient that is previously obtained such that a time response is the same between the estimated temperature and temperature change of the first portion.

In a third aspect of the present invention based on the first or the second aspect, in the third step, the estimated temperature and a predetermined estimated temperature threshold value are compared with each other, and whether or not at least one of an operation of the temperature adjusting device and an operation of the medium supply and collection device is stopped, or whether or not at least one of an operation of the temperature adjusting device and an operation of the medium supply and collection device is switched from the first mode to the second mode, is determined based on a comparison result.

In a fourth aspect of the present invention based on the third aspect, the estimated temperature threshold value is a function of thermal displacement of the first portion, or temperature change of the first portion after stopping of an operation of the temperature adjusting device and an operation of the medium supply and collection device, and the estimated temperature threshold value is determined according to thermal displacement or temperature change to be allowed.

In a fifth aspect of the present invention based on the third or the fourth aspect, the method includes a preprocessing step of measuring the structural-member temperature and the reference temperature before a machining operation that causes temperature change of the medium having a temperature to be adjusted, obtaining a temperature change value based on the structural-member temperature and the reference temperature, obtaining the estimated temperature of the first portion based on the temperature change value, obtaining a rate of change of the estimated temperature, comparing the rate of change of the estimated temperature with a predetermined rate-of-change threshold value, and updating the estimated temperature threshold value according to a comparison result.

In a sixth aspect of the present invention based on the fifth aspect, the rate-of-change threshold value is a function of an ambient temperature in an environment in which the machine tool is mounted, and, in the preprocessing step, the ambient temperature is measured, and the rate-of-change threshold value is determined based on the ambient temperature.

In a seventh aspect of the present invention based on one of the first to the sixth aspects, the structural member is a rotating device that includes a rotating portion having a rotating member that rotates about a predetermined axis, and a bearing that pivotally supports the rotating member, and a supporting portion that supports the rotating portion. The medium supply and collection device collects the medium having a temperature to be adjusted, from a medium flow path provided in the supporting portion or the rotating portion, and the temperature adjusting device adjusts a temperature of the medium having a temperature to be adjusted, and the medium supply and collection device then resupplies the medium having a temperature to be adjusted, into the medium flow path. The first portion is the rotating portion and the second portion is other than the rotating device. In the first step, a temperature of a portion of the supporting portion, or a temperature of the medium, having a temperature to be adjusted, in the medium flow path is measured as the structural-member temperature.

In an eighth aspect of the present invention based on one of the first to the sixth aspects, in the method for controlling the temperature adjustment system of the machine tool, the structural member is a table mounted in a machining space of the machine tool, and the medium supply and collection device collects, the medium having a temperature to be adjusted, from the machining space, the temperature adjusting device adjusts a temperature of the medium having a temperature to be adjusted, and the medium supply and collection device then resupplies, the medium having a temperature to be adjusted, into the machining space. The first portion is a part of the table, and the second portion is outside the machining space.

"At least one of an operation of the temperature adjusting device and an operation of the medium supply and collection device is stopped" in the first and the third aspects means not only that supply, of the medium having a temperature to be adjusted, by the medium supply and collection device is stopped, but also that, for example, adjustment, by the temperature adjusting device, of a temperature of the medium having a temperature to be adjusted is stopped, and power supply for the temperature adjusting device or the medium supply and collection device is disconnected.

According to the present invention, in a first step, a structural-member temperature that is a temperature near a first portion in the structural member is measured, a reference temperature that is a temperature of a second portion in the machine tool is measured, and a temperature change value is obtained based on the structural-member temperature and the reference temperature, after stopping of a machining operation that causes temperature change of the medium having a temperature to be adjusted. The first portion contributes to the temperature change of the medium having a temperature to be adjusted and is deformed due to the temperature change of the medium having a temperature to be adjusted. The second portion is not involved in the temperature change of the medium having a temperature to be adjusted, and is not deformed due to the temperature change of the medium having a temperature to be adjusted. In a second step, an estimated temperature of the first portion is obtained based on the temperature change value. In a third step, based on the estimated temperature, whether or not at least one of an operation of the temperature adjusting device and an operation of the medium supply and collection device is stopped, or whether or not at least one of an operation of the temperature adjusting device and an operation of the medium supply and collection device is switched from a first mode representing a normal operation to a second mode in which power consumption is less than that in the first mode, is determined. Therefore, as compared to a conventional method based only on a temperature of a medium having a temperature to be adjusted, for example, supply, of the medium having a temperature to be adjusted, by the medium supply and collection device can be stopped, or an operation of the temperature adjusting device or an operation of the medium supply and collection device can be switched from the first mode to the second mode without deteriorating machining accuracy, thereby efficiently reducing power consumption.

DESCRIPTION OF THE PREFERRED EMBODIMENTS

Hereinafter, an embodiment of a method for controlling a temperature adjustment system of a machine tool according to the present invention will be described in detail with reference to the drawings.

Figure 1:
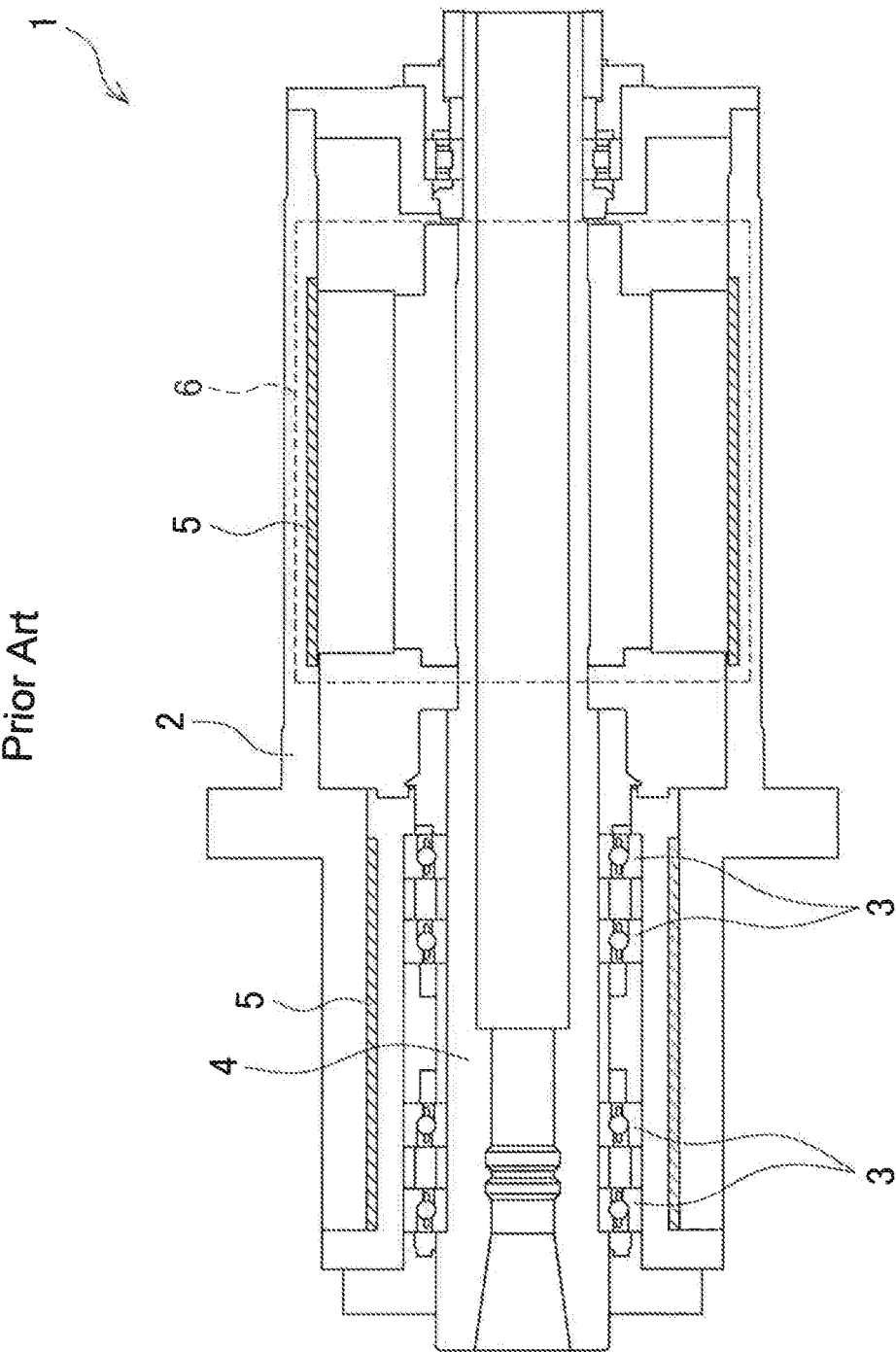
FIG. 1 illustrates a cross-section, in an axial direction, of a main spindle device.
Figure 2:
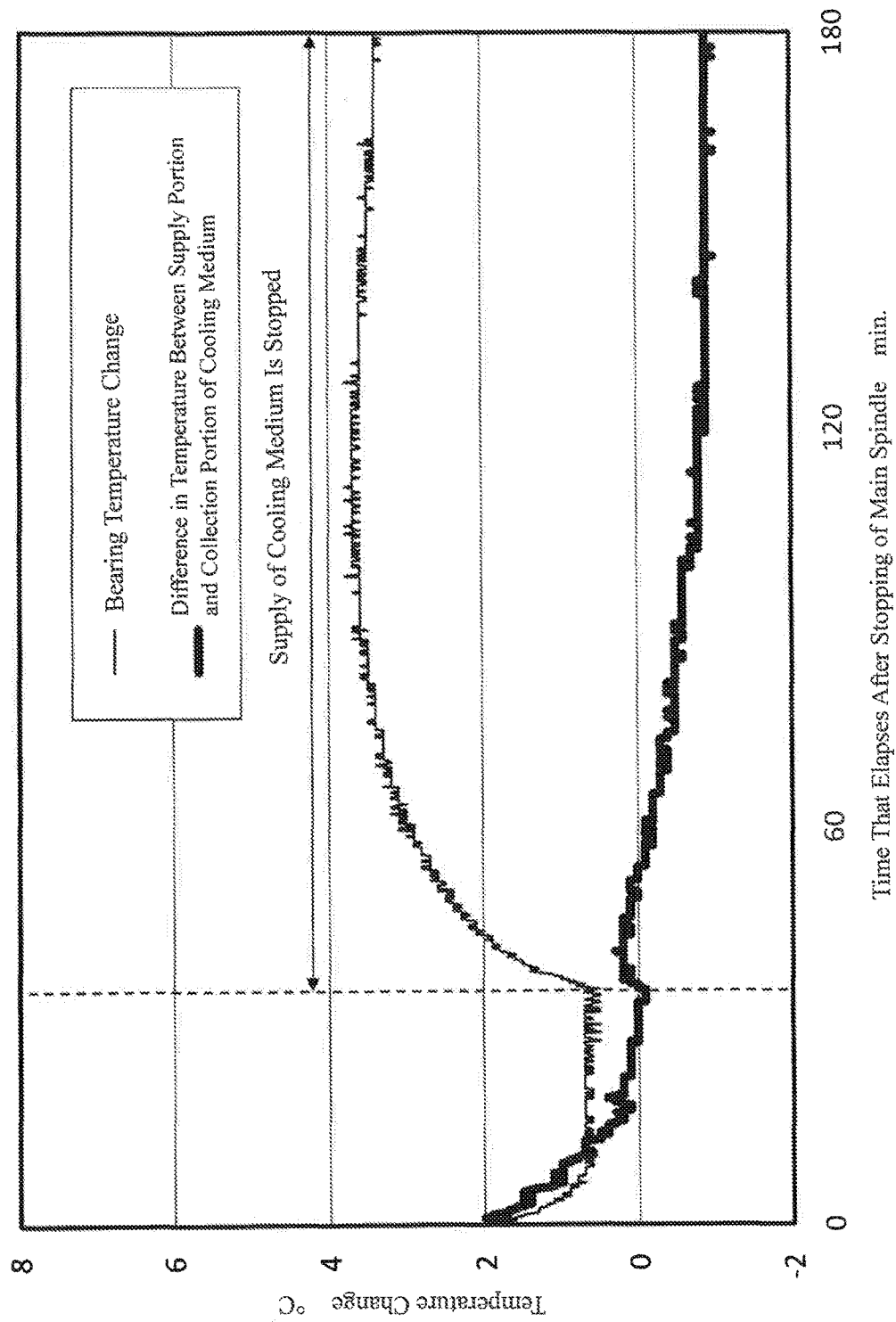
FIG. 2 illustrates a result of measuring change of a temperature of a bearing of the main spindle device in a case where, after a main spindle is stopped, a temperature difference between a temperature of a cooling medium to be supplied to a cooling flow path and a temperature of the cooling medium collected from the cooling flow path is sufficiently reduced, and then supply of the cooling medium from a cooling device is stopped.
Figure 3:
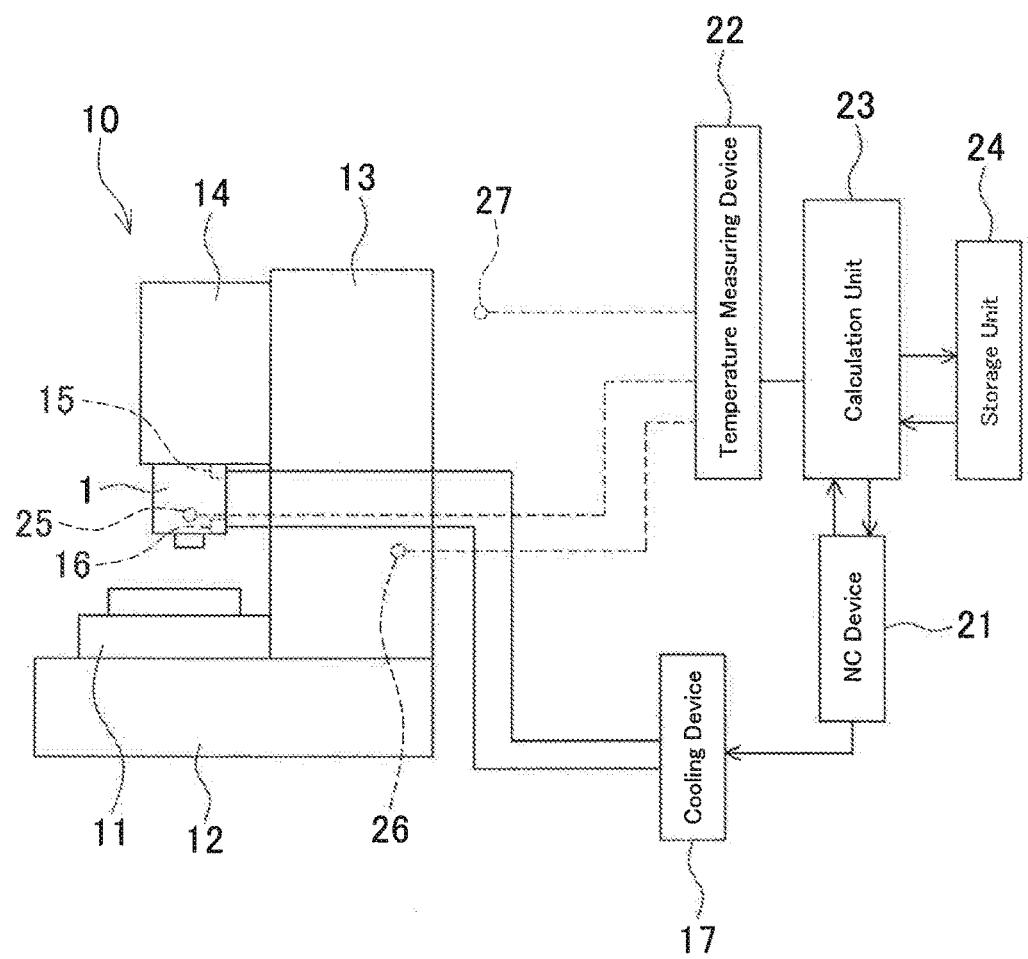
FIG. 3 is a block diagram illustrating a machine tool, and a cooling system for the main spindle device.

Firstly, a cooling system for cooling a rotating portion of a main spindle device 1 will be described with reference to FIG. 3. FIG. 3 is a block diagram illustrating a machine tool 10 and the cooling system. The main spindle device 1 to be cooled is the same as the main spindle device 1, as shown in FIG. 1, which has been conventionally used.

The machine tool 10 machines a workpiece placed on a table 11 by means of a tool mounted to the main spindle device 1. The table 11 is mounted on the top surface of a bed 12. Further, on the top surface of the bed 12, a column 13 is erected at a position rearward of the table 11. A main spindle head 14 is mounted on the front surface side of the column 13 so as to support the main spindle device 1.

On the other hand, the cooling system (temperature adjustment system) includes a cooling device 17, sensors 25 to 27, a temperature measuring device 22, a calculation unit 23, a storage unit 24, and an NC device 21. The cooling device 17 cools a cooling medium that is a medium having a temperature to be adjusted, and supplies and collects the cooling medium to and from the main spindle device 1. The temperature measuring device 22 measures temperatures by using the sensors 25 to 27, respectively. The calculation unit 23 performs various calculations based on temperature information. The NC device 21 controls operations of the machine tool 10 and the cooling device 17. The cooling device 17 is connected via a tube to a supply opening 15 and a collection opening 16, for the cooling medium, provided in the main spindle device 1, which forms a cooling circuit in which the cooling medium having been collected through the collection opening 16 from a cooling flow path is cooled by the cooling device 17, and then the cooling medium is supplied through the supply opening 15 into the cooling flow path. The machine body temperature sensor 26 for measuring a reference temperature of the machine tool 10 is attached to the column 13. It is confirmed from temperature measurement in advance that the column 13 is not involved in temperature change of the cooling medium, and is not affected by temperature change of the cooling medium (that is, the column 13 does not perform heat exchange with the cooling medium, and is not deformed due to temperature change of the cooling medium). The main spindle temperature sensor 25 for measuring a main spindle temperature that is a temperature of the housing 2 of the main spindle device 1 having the bearings 3, 3 . . . is attached to the main spindle device 1. The bearings 3, 3 . . . of the main spindle device 1 contribute to temperature change of the cooling medium, and are affected by temperature change of the cooling medium (that is, the bearings 3, 3 . . . perform heat exchange with the cooling medium, and are deformed due to temperature change of the cooling medium). The ambient temperature sensor 27 is also provided for measuring a surrounding ambient temperature. The sensors 25 to 27 are connected to the temperature measuring device 22, and the temperature measuring device 22 measures the reference temperature, the main spindle temperature, and the ambient temperature. Further, the temperature measuring device 22 is connected to the calculation unit 23. According to various temperature information obtained from measurement by the temperature measuring device 22, the calculation unit 23 calculates an estimated temperature of a portion (that is, the rotating portion) such as bearings 3, 3, . . . near the main spindle 4, which is subjected to the thermal displacement which influences on machining accuracy, and a rate of change of the estimated temperature, as described below. Further, the calculation unit 23 is connected also to the storage unit 24, and the calculation results are stored in the storage unit 24. In addition, the calculation unit 23 is connected also to the NC device 21. The calculation unit 23 determines a cooled state of the main spindle device 1 based on the calculation results and a state of an instruction to a motor of the main spindle device 1 by the NC device 21, and controls an operation of the cooling device 17 via the NC device 21.

Calculations, of an estimated temperature of a portion near the main spindle 4 and a rate of change of the estimated temperature, performed by the calculation unit 23 will be firstly described in detail. A temperature rise value (temperature change value) of the main spindle device 1 obtained in the k-th measurement is represented as $\Delta T_k$ (temperature difference between the reference temperature and the main spindle temperature), a sampling period for the temperature rise value is represented as $\Delta ts$, and a filter time constant is represented as T. In this case, a filter coefficient F that is predefined such that a time response is the same between the estimated temperature and the temperature rise (temperature change) of the portion near the main spindle 4 is represented by the following equation 1. An estimated temperature $y_k$ in the k-th measurement is represented by the following equation 2.

$$F = \frac{\Delta ts}{\Delta ts + T} \qquad \text{[Equation 1]}$$

$$y_k = y_{k-1} + (\Delta T_k - y_{k-1})F \qquad \text{[Equation 2]}$$

Figure 4:
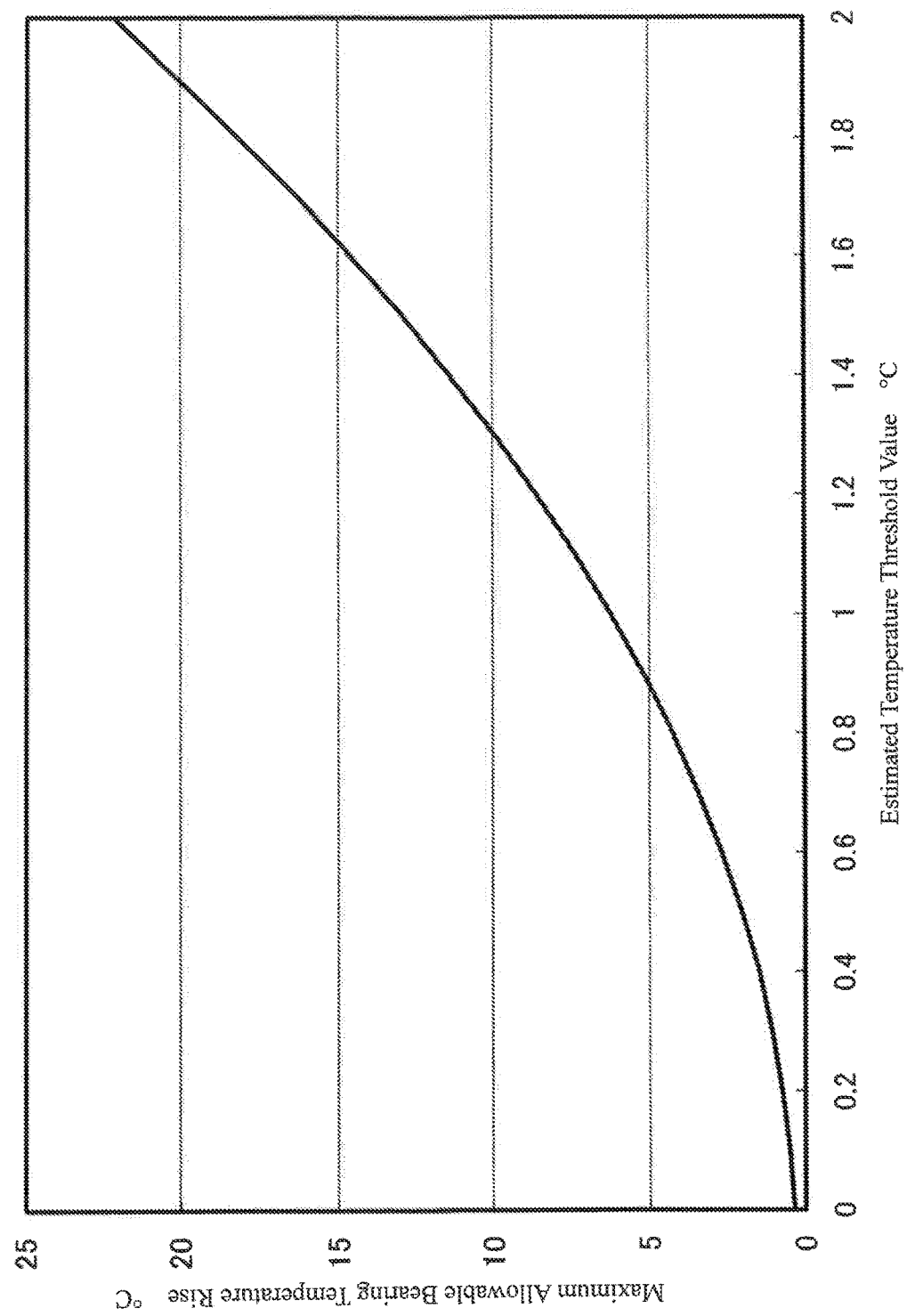
FIG. 4 illustrates a relationship between estimated temperature threshold values and maximum allowable bearing temperature rise.

The calculation unit 23 calculates the estimated temperature $y_k$ by using the temperature rise value $\Delta T_k$ and the filter coefficient F according to the above equations 1 and 2, determines whether or not the estimated temperature $y_k$ meets a predetermined estimated temperature threshold value that has been previously set, and switches an operation of the cooling device 17 based on the result of the determination. As to the estimated temperature threshold value, a relationship between maximum allowable portion-neighboring-main spindle temperature rise and the estimated temperature threshold values after stopping of rotation of the main spindle 4 is previously obtained based on a result of an actual measurement. For example, FIG. 4 indicates a relationship between maximum allowable bearing temperature rise (the maximum allowable portion-neighboring-main spindle temperature rise) and the estimated temperature threshold values obtained from stopping of rotation of the main spindle 4 that has been rotated at a rotation speed of 2000 min$^{-1}$ until after stopping of the cooling device 17. Based on the relationship indicated in FIG. 4, the estimated temperature threshold value is determined according to a temperature rise value to be allowed (that is, the estimated temperature threshold value is a function of temperature rise of the bearings 3 after stopping of the cooling device 17).

On the other hand, the temperature rise value $\Delta T_k$ for obtaining the estimated temperature $y_k$ shifts for each sensor due to difference among the individual sensors for measuring the main spindle temperature and the reference temperature (hereinafter, referred to as temperature shift). Therefore, a difference between the reference temperature and the main spindle temperature in a state where no heat generation occurs in the main spindle has to be cancelled. That is, a state where a rate-of-change $dy_k/dt$ of the estimated temperature $y_k$ obtained by the following equation 3 satisfies a predetermined rate-of-change threshold value is regarded as a state where no heat generation occurs in the main spindle, and the estimated temperature $y_k$ at that time is calculated as a temperature shift amount, and the temperature shift amount is added to the estimated temperature threshold value to update the estimated temperature threshold value as the most recent value. Accordingly, the temperature shift is overcome.

$$\frac{dy_k}{dt} = \left| \frac{y_k - y_{k-1}}{\Delta ts} \right| \qquad \text{[Equation 3]}$$

Figure 5:
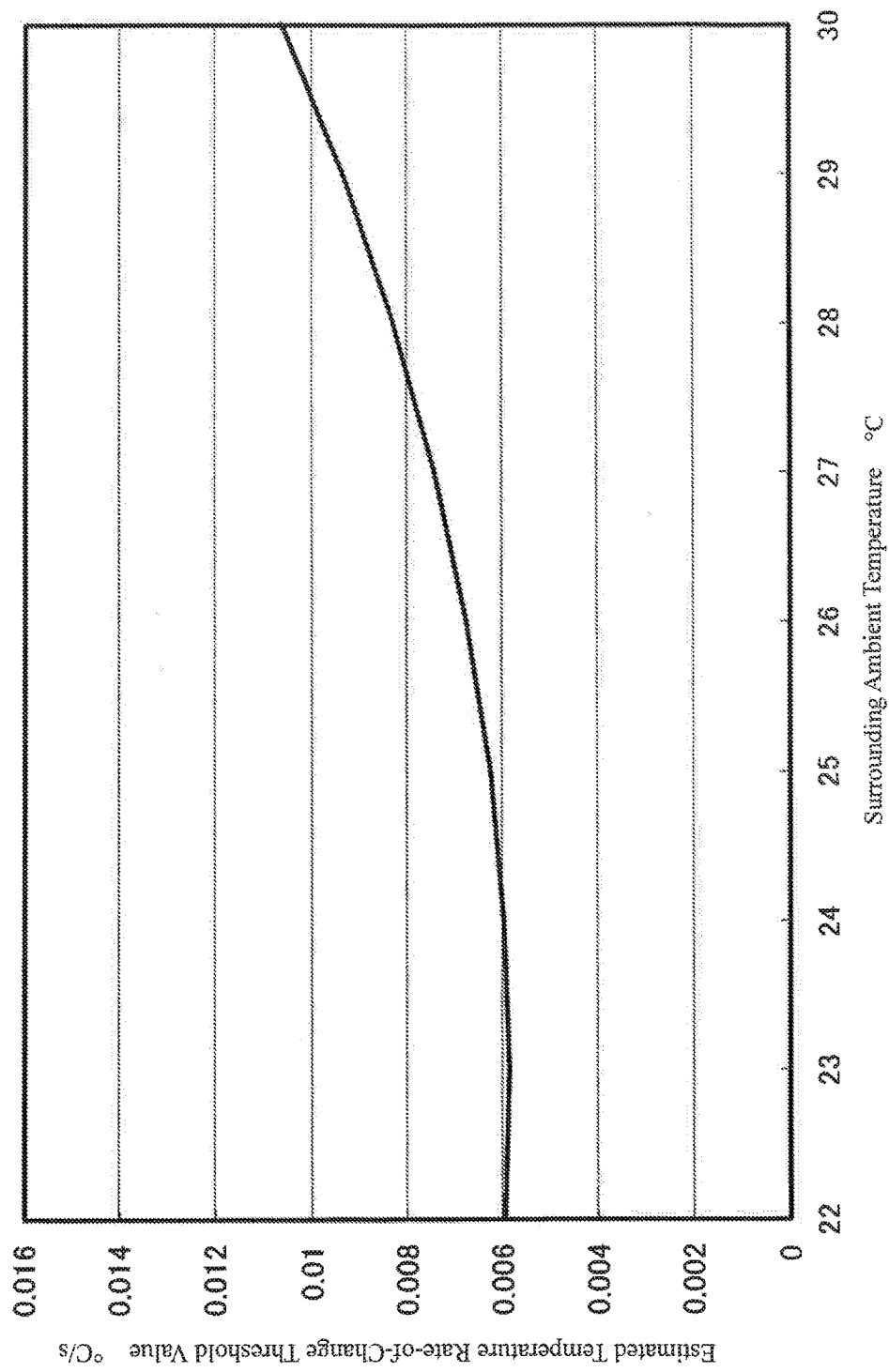
FIG. 5 illustrates a relationship between an ambient temperature and a rate-of-change threshold value.

The rate-of-change threshold value is determined according to a cooling control cycle of the cooling device 17 which varies according to the ambient temperature. Therefore, for example, a rate-of-change threshold value is determined according to the most recent ambient temperature measured by the ambient temperature sensor 27 based on a relationship, between the ambient temperature and the rate-of-change threshold value (threshold value of the rate-of-change of the estimated temperature), which is previously obtained from a result of an actual measurement, as shown in FIG. 5 (that is, the rate-of-change threshold value is a function of the ambient temperature).

Figure 6:
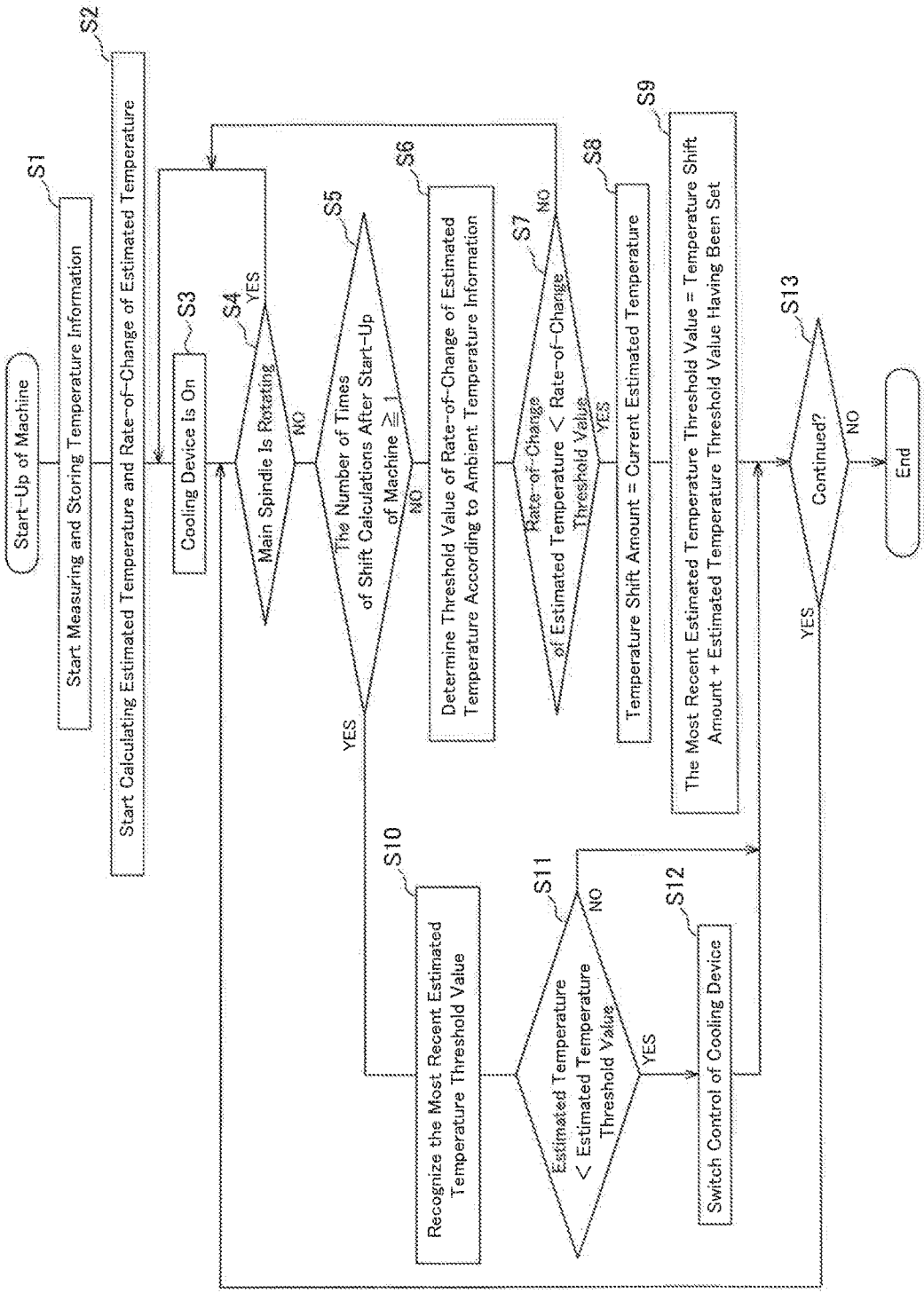
FIG. 6 is a flow chart showing a control for cooling of the main spindle device.

Next, a method for controlling the cooling system that cools the main spindle device 1 will be described with reference to a flow chart shown in FIG. 6. According to start-up of the cooling system, measuring and storing of the temperature information such as the reference temperature and the main spindle temperature are started (S1), and calculating of the estimated temperature $y_k$ and the rate-of-change $dy_k/dt$ of the estimated temperature $y_k$ is started (S2). Thereafter, the operation of the cooling device 17 is started (S3). When the main spindle 4 is at a stop (determination in S4 is NO), whether or not calculation for canceling the temperature shift after start-up of the cooling system has been performed is determined (S5). In a case where the calculation for canceling the temperature shift has not been performed (determination in S5 is NO), the rate-of-change threshold value is determined based on the ambient temperature as described above (S6), and the rate-of-change $dy_k/dt$ and the rate-of-change threshold value are compared with each other (S7). When the result of the comparison indicates that the rate-of-change $dy_k/dt$ is less than the rate-of-change threshold value (determination in S7 is YES), the current estimated temperature $y_k$ is set as the temperature shift amount (S8), and the temperature shift amount is added to the estimated temperature threshold value that has been previously set, so as to update the estimated temperature threshold value as the most recent value (S9), as described above. Thereafter, when the main spindle 4 starts rotating (determination in S4 is YES), the cooling device 17 is operated in a first mode corresponding to a normal operation in which cooling capability is high, until the main spindle 4 stops rotating (until determination in S4 becomes NO). Further, when the main spindle 4 stops rotating (that is, a machining operation which causes temperature change of the medium having a temperature to be adjusted is stopped), the estimated temperature threshold value calculated as the most recent value in S9 is recognized (S10), and the estimated temperature $y_k$ and the estimated temperature threshold value are compared with each other (S11). When the estimated temperature $y_k$ is less than the estimated temperature threshold value (determination in S11 is YES), supply of the cooling medium into the cooling flow path by the cooling device 17 is stopped, or the operation of the cooling device 17 is switched such that, for example, the cooling device 17 is operated in a second mode (a state where a cooling capability is lowered by, for example, lowering output of a refrigerator or a pump) in which power consumption is lower than that in the first mode (S12), and whether or not the process is to be continued is then determined (S13) to end the process. The measuring, of the temperature information such as the reference temperature and the main spindle temperature, which is started in S1, and calculating, of the estimated temperature $y_k$ and the rate-of-change $dy_k/dt$ of the estimated temperature $y_k$, which is started in S2 are constantly performed after the start-up of the cooling system.

In the method for controlling the cooling system of the main spindle device 1 as described above, by using the reference temperature measured by the machine body temperature sensor 26 mounted to a portion, of the machine tool 10, other than the main spindle device 1, that is, by using a temperature measured in a portion that is not involved in the temperature change of the cooling medium, and is not affected by the temperature change of the cooling medium, the temperature rise value $\Delta T_k$ of the main spindle device 1 after stopping of the rotation of the main spindle 4 is obtained to calculate the estimated temperature $y_k$. Therefore, as compared to a conventional method based only on a temperature of a cooling medium, supply of the cooling medium by the cooling device 17 can be stopped or the operation of the cooling device 17 can be switched from the first mode to the second mode without deteriorating a machining accuracy in the main spindle device 1. Accordingly, power consumption is efficiently reduced.

Further, since the estimated temperature threshold value is determined in consideration of the temperature shift amount, whether or not the main spindle device 1 has been cooled can be determined with enhanced accuracy, whereby the above-described effect is more significantly exhibited.

Figure 7:
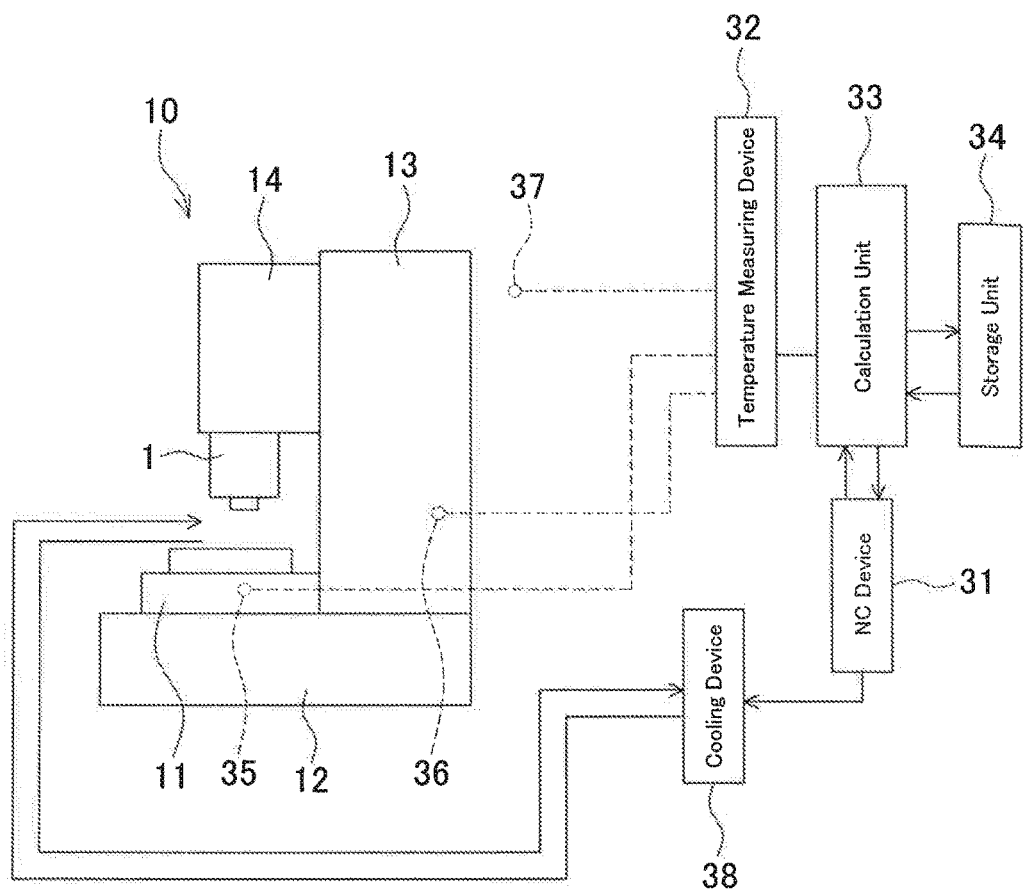
FIG. 7 is a block diagram illustrating a machine tool and a cooling system for a table.

Next, a cooling system in which the table 11 of the machine tool 10 is an object to be cooled will be described with reference to FIG. 7. FIG. 7 is a block diagram illustrating the machine tool 10 and the cooling system. The entire configuration of the machine tool 10 is almost the same as that of the machine tool 10 of the first embodiment, and description thereof is not given in detail. In FIG. 7, the same components as in the first embodiment are denoted by the same reference numerals.

The cooling system (temperature adjustment system) of the second embodiment includes a cooling device 38 that cools a cooling medium (cutting fluid in the description herein) that is a medium having a temperature to be adjusted, and supplies the cooling medium into a machining space in which the table 11 is mounted, and collects the cooling medium from the machining space, sensors 35 to 37, a temperature measuring device 32 that measures temperatures by using the sensors 35 to 37, respectively, a calculation unit 33 that performs various calculations based on temperature information, a storage unit 34, and an NC device 31 that controls operations of the machine tool 10 and the cooling device 38. The cooling device 38 is connected to two tubes that extend from the machining space in which the table 11 is mounted. The cooling device 38 cools the cooling medium collected from the machining space through one of the tubes, and then resupplies the cooling medium into the machining space (in particular, above the table 11) through the other of the tubes. The machine body temperature sensor 36 for measuring a reference temperature of the machine tool 10 is attached to the column 13. It is confirmed from temperature measurement in advance that the column 13 is not involved in temperature change of the cooling medium, and is not affected by temperature change of the cooling medium (that is, the column 13 does not perform heat exchange with the cooling medium, and is not deformed due to temperature change of the cooling medium). The table temperature sensor 35 for measuring a table temperature that is a temperature of the table 11, is attached to the table 11. The table 11 contributes to temperature change of the cooling medium, and is affected by temperature change of the cooling medium (that is, the table 11 performs heat exchange with the cooling medium, and is deformed due to temperature change of the cooling medium). The ambient temperature sensor 37 is also provided for measuring a surrounding ambient temperature. The sensors 35 to 37 are connected to the temperature measuring device 32, and the temperature measuring device 32 measures the reference temperature, the table temperature, and the ambient temperature. Further, the temperature measuring device 32 is connected to the calculation unit 33. The calculation unit 33 calculates, according to various temperature information obtained from measurement by the temperature measuring device 32, an estimated temperature of a portion near the table 11 which is subjected to the thermal displacement which exerts influence on machining accuracy, and a rate of change of the estimated temperature, as described below. Further, the calculation unit 33 is connected also to the storage unit 34, and the calculation results are stored in the storage unit 34. In addition, the calculation unit 33 is connected also to the NC device 31. The calculation unit 33 determines a temperature change of the table 11 based on the calculation results and on a state of an instruction to a motor of the main spindle device 1 by the NC device 31, and controls an operation of the cooling device 38 via the NC device 31.

Calculations, of an estimated temperature of a portion near the table 11 and a rate of change of the estimated temperature, performed by the calculation unit 33 will be firstly described in detail. A temperature rise value (temperature change value) of the table 11 obtained in the k-th measurement is represented as $\Delta T_k$ (temperature difference between the reference temperature and the table temperature), a sampling period for the temperature rise value is represented as $\Delta ts$, and a filter time constant is represented as T. In this case, a filter coefficient F that is predefined such that a time response is the same between the estimated temperature and the temperature rise (temperature change) of the portion near the table 11 is represented by the following equation 4. An estimated temperature $y_k$ in the k-th measurement is represented by the following equation 5.

$$F = \frac{\Delta ts}{\Delta ts + T} \quad \text{[Equation 4]}$$

$$y_k = y_{k-1} + (\Delta T_k - y_{k-1})F \quad \text{[Equation 5]}$$

Figure 8:
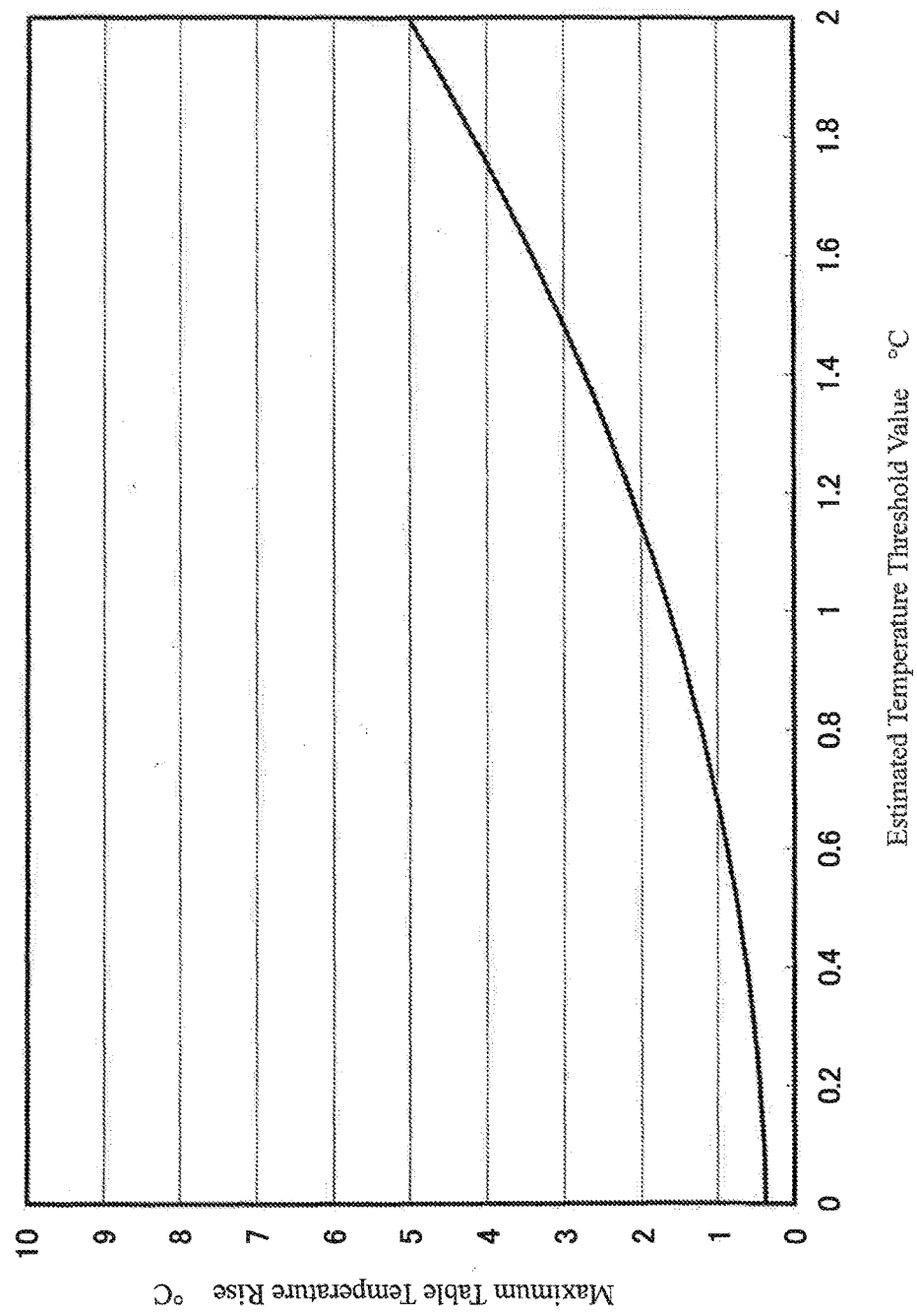
FIG. 8 illustrates a relationship between estimated temperature threshold values and maximum table temperature rise.

The calculation unit 33 calculates the estimated temperature $y_k$ by using the temperature rise value $\Delta T_k$ and the filter coefficient F according to the above equations 4 and 5, determines whether or not the estimated temperature $y_k$ meets a predetermined estimated temperature threshold value that has been previously set, and switches an operation of the cooling device 38 based on the result of the determination. As to the estimated temperature threshold value, a relationship between maximum portion-neighboring-table temperature rise for the table 11 and the estimated temperature threshold values is previously obtained based on a result of an actual measurement. For example, FIG. 8 indicates a relationship between maximum table temperature rise (maximum portion-neighboring-table temperature rise) and the estimated temperature threshold values after stopping of the cooling device 38. Based on the relationship indicated in FIG. 8, the estimated temperature threshold value is determined according to a temperature rise value to be allowed (that is, the estimated temperature threshold value is a function of temperature rise of the table 11 after stopping of the cooling device 38).

On the other hand, the temperature rise value $\Delta T_k$ for obtaining the estimated temperature $y_k$ shifts for each sensor due to difference among the individual sensors for measuring the table temperature and the reference temperature (hereinafter, referred to as temperature shift). Therefore, a difference between the reference temperature and the table temperature in a state where no temperature rise occurs in the table 11 has to be cancelled. That is, a state where a rate-of-change $dy_k/dt$ of the estimated temperature $y_k$ obtained by the following equation 6 satisfies a predetermined rate-of-change threshold value is regarded as a state where no temperature rise occurs in the table 11, and the estimated temperature $y_k$ at that time is calculated as a temperature shift amount, and the temperature shift amount is added to the estimated temperature threshold value to update the estimated temperature threshold value as the most recent value. Accordingly, the temperature shift is overcome.

$$\frac{dy_k}{dt} = \left| \frac{y_k - y_{k-1}}{\Delta ts} \right| \quad \text{[Equation 6]}$$

Figure 9:
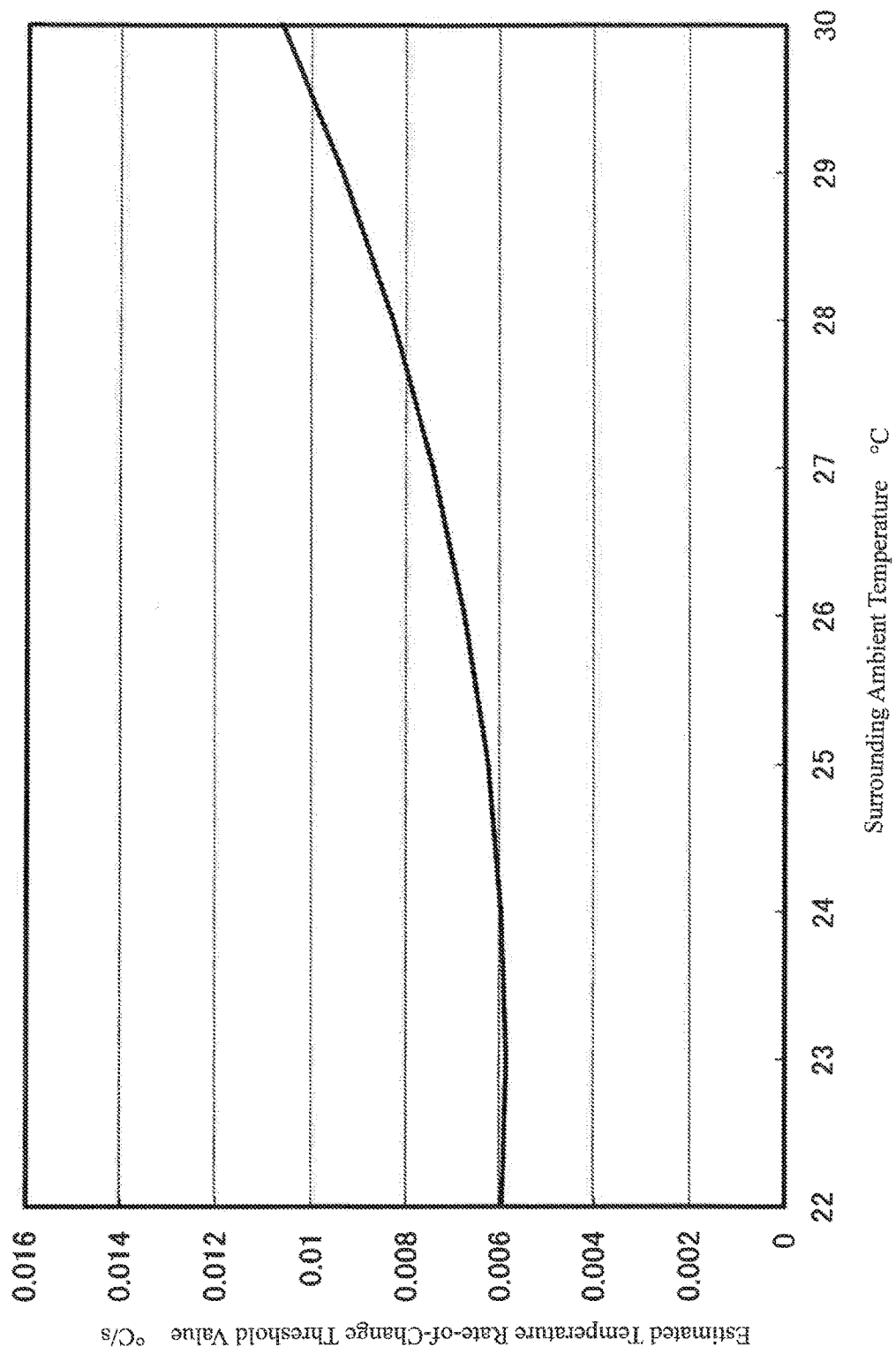
FIG. 9 illustrates a relationship between an ambient temperature and a rate-of-change threshold value.

The rate-of-change threshold value is determined according to a cooling control cycle of the cooling device 38 which varies according to the ambient temperature. Therefore, for example, a rate-of-change threshold value is determined according to the most recent ambient temperature measured by the ambient temperature sensor 37 based on a relationship, between the ambient temperature and the rate-ofchange threshold value (threshold value of the rate-of-change of the estimated temperature), which is previously obtained from a result of an actual measurement, as shown in FIG. 9 (that is, the rate-of-change threshold value is a function of the ambient temperature).

Figure 10:
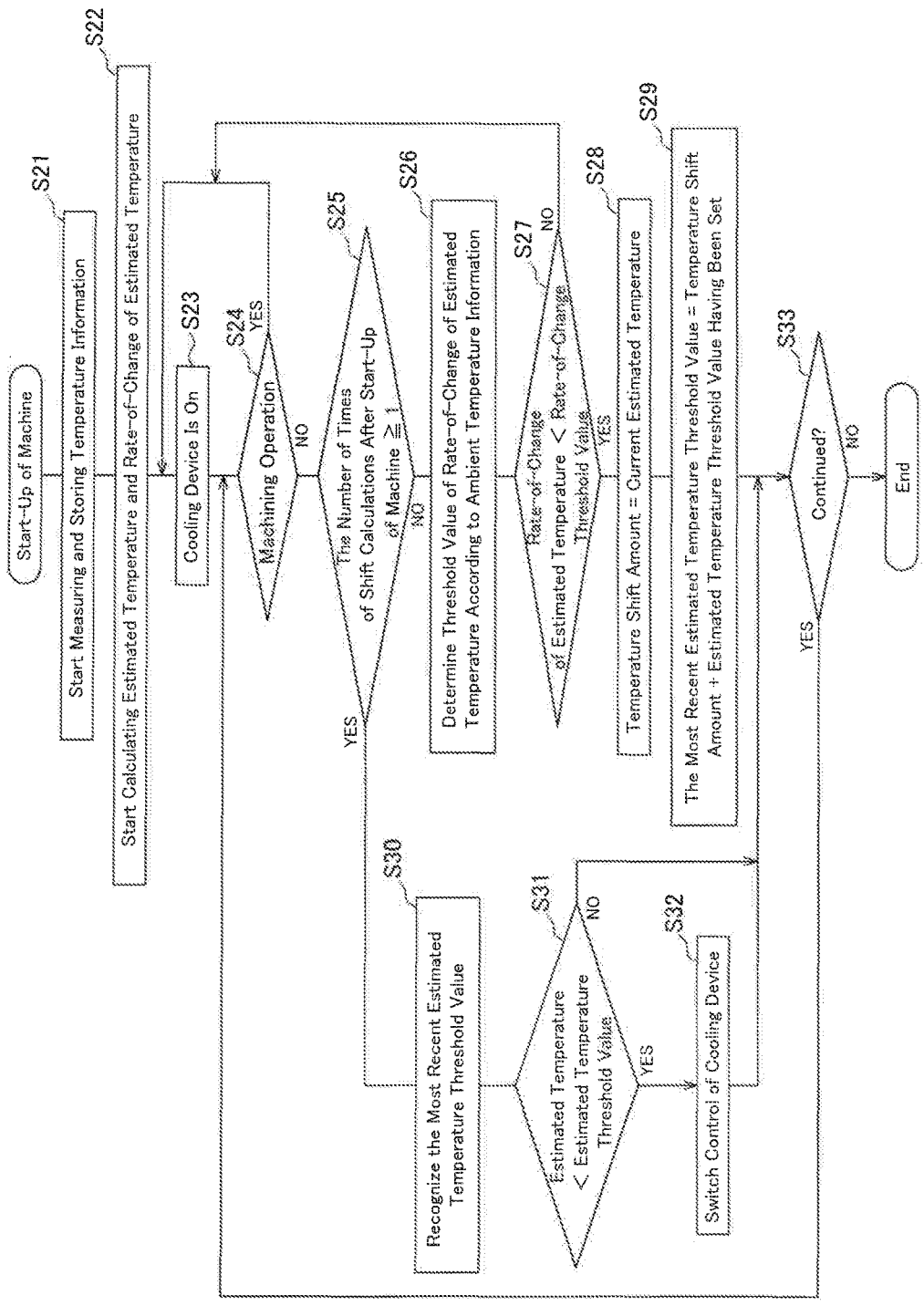
FIG. 10 is a flow chart showing a control for cooling of the table.

Next, a method for controlling the cooling system that cools the table 11 will be described with reference to a flow chart shown in FIG. 10. According to start-up of the cooling system, measuring and storing of the temperature information such as the reference temperature and the table temperature are started (S21), and calculating of the estimated temperature $y_k$ and the rate-of-change $dy_k/dt$ of the estimated temperature $y_k$ is started (S22). Thereafter, the operation of the cooling device 38 is started (S23). Whether or not a machining operation is being performed is determined (S24). When the machining operation is stopped (determination in S24 is NO), whether or not calculation for canceling the temperature shift after start-up of the cooling system has been performed is determined (S25). In a case where the calculation for canceling the temperature shift has not been performed (determination in S25 is NO), the rate-of-change threshold value is determined based on the ambient temperature as described above (S26), and the rate-of-change $dy_k/dt$ and the rate-of-change threshold value are compared with each other (S27). When the result of the comparison indicates that the rate-of-change $dy_k/dt$ is less than the rate-of-change threshold value (determination in S27 is YES), the current estimated temperature $y_k$ is set as the temperature shift amount (S28), and the temperature shift amount is added to the estimated temperature threshold value that has been previously set, to update the estimated temperature threshold value as the most recent value (S29), as described above. Thereafter, when the machining operation is started (determination in S24 is YES), the cooling device 38 is operated in a first mode corresponding to a normal operation in which cooling capability is high, until the machining operation is stopped (until determination in S24 becomes NO). Further, when the machining operation is stopped (that is, a machining operation which causes temperature change of the medium having a temperature to be adjusted is stopped), the estimated temperature threshold value calculated as the most recent value in S29 is recognized (S30), and the estimated temperature $y_k$ and the estimated temperature threshold value are compared with each other (S31). When the estimated temperature $y_k$ is less than the estimated temperature threshold value (determination in S31 is YES), supply of the cooling medium into the machining space by the cooling device 38 is stopped, or the operation of the cooling device 38 is switched such that, for example, the cooling device 38 is operated in a second mode (a state where a cooling capability is lowered by, for example, lowering output of a refrigerator or a pump) in which power consumption is lower than that in the first mode (S32), and whether or not the process is to be continued is then determined (S33) to end the process. The measuring, of the temperature information such as the reference temperature and the table temperature, which is started in S21, and calculating, of the estimated temperature $y_k$ and the rate-of-change $dy_k/dt$ of the estimated temperature $y_k$, which is started in S22 are constantly performed after the start-up of the cooling system.

In the method for controlling the cooling system for the table 11 as described above, by using the reference temperature measured by the machine body temperature sensor 36 mounted to a portion, of the machine tool 10, other than the table 11, that is, by using a temperature measured in a portion that is not involved in the temperature change of the cooling medium, and is not affected by the temperature change of the cooling medium, the temperature rise value $\Delta T_k$ in a portion near the table 11 after stopping of the machining operation is obtained to calculate the estimated temperature $y_k$. Therefore, as compared to a conventional method based only on a temperature of a cooling medium, supply of the cooling medium by the cooling device 38 can be stopped or the operation of the cooling device 38 can be switched from the first mode to the second mode without deteriorating a machining accuracy, thereby efficiently reducing power consumption.

Further, since the estimated temperature threshold value is determined in consideration of the temperature shift amount, the temperature rise of the table 11 can be determined with enhanced accuracy, whereby the above-described effect is more significantly exhibited.

The method for controlling the temperature adjustment system of the machine tool according to the present invention is not limited to the above embodiments in any way. Not only the position in which each temperature sensor is mounted, a type of a medium having a temperature to be adjusted, a type of the machine tool, and the like, but also the control for temperature adjustment and the like can be changed as appropriate without departing from the gist of the present invention.

For example, in the first embodiment and the second embodiment, the method for controlling the cooling system of a machine tool is described. However, the present invention can be advantageously used for a method for controlling another type of temperature adjustment system, such as a method for controlling a heating system or a heat retaining system of a machine tool (in this case, a so-called heating device is temperature adjusting device).

Further, in the first embodiment, a rotating portion of the main spindle device, such as bearings and a portion near the main spindle, is an object to be subjected to deformation reduction. However, there is no problem if a rotating portion of another rotating device, such as a feed shaft or a rotary shaft of a table, which includes a rotating member that rotates about a predetermined axis and bearings that pivotally support the rotating member, is an object to be subjected to deformation reduction. In the second embodiment, a table is an object to be subjected to deformation reduction. However, needless to say, another structural member in a machining space may be an object to be subjected to deformation reduction.

Further, in the first embodiment, a temperature of the housing is measured as a temperature of a supporting portion. However, a temperature of a joint housing, a cap, or the like other than a temperature of the housing may be measured. A portion of the supporting portion at which the temperature is to be measured is changeable as appropriate as long as the temperature to be measured is a temperature of a portion of the supporting portion for supporting the rotating portion which includes the main spindle and bearings. In addition, a temperature of a medium, having a temperature to be adjusted, in a medium flow path provided, for example, inside the housing or in the surface of the rotating member, may be measured as a temperature of the supporting portion.

Furthermore, in the first embodiment and the second embodiment, in order to switch an operation of the temperature adjusting device or a medium supply and collection device, supply, of the medium having a temperature to be adjusted, by the medium supply and collection device is stopped, or at least one of the temperature adjusting device and the medium supply and collection device is operated in the second mode in which power consumption is less than in the first mode. However, there is no problem if, for example, adjustment of the temperature of the medium having a temperature to be adjusted is stopped in the temperature adjusting device (for example, cooling of the collected cooling medium is stopped), or power supply for the temperature adjusting device or the medium supply and collection device is disconnected.

Further, the machine body temperature sensor for measuring the reference temperature is mounted to the column. However, a position at which the reference temperature is to be measured is changeable as appropriate. There is no problem if the reference temperature is measured at a portion such as the bed instead of the column as long as the portion such as the bed is not involved in temperature change of the medium having a temperature to be adjusted, and is not affected by the temperature change of the medium having a temperature to be adjusted. The column and the bed are not affected by the temperature change of the main spindle, and are particularly advantageous.

Further, in the first embodiment, a medium flow path to be provided in the rotating device can be optionally determined as appropriate. For example, the medium flow path may be provided in the outer circumferential surface of the main spindle. Further, in the second embodiment, the medium having a temperature to be adjusted is supplied into a machining space, to cool the table. However, the present invention can be advantageously used also in a case where a medium flow path such as a cooling flow path is provided in a structural member such as the table, and the medium having a temperature to be adjusted is supplied into the medium flow path, and collected from the medium flow path.

Furthermore, in the first embodiment, the estimated temperature threshold value is a function of a temperature change of the rotating portion after stopping of the temperature adjusting device and the medium supply and collection device. However, there is no problem if the estimated temperature threshold value is a function of thermal displacement of the rotating portion. Similarly, although, in the second embodiment, the estimated temperature threshold value is a function of a temperature change of the table after stopping of the temperature adjusting device and the medium supply and collection device, there is no problem if the estimated temperature threshold value is a function of the thermal displacement of the table.

Furthermore, in the first embodiment and the second embodiment, the temperature adjustment of the medium having a temperature to be adjusted, and supply and collection of the medium having a temperature to be adjusted are performed only by the cooling device. However, needless to say, the temperature adjusting device and the medium supply and collection device may be implemented as separate devices, respectively.

In addition, in the first embodiment and the second embodiment, the temperature of the cooling medium is adjusted. However, the present invention can be advantageously used also for a machine tool having the temperature adjusting device by which the temperature of oil supplied in an operation by oil pressure is adjusted.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. A method for controlling a temperature adjustment system of a machine tool, the temperature adjustment system including: a medium supply and collection device for supplying, a medium having a temperature to be adjusted, to a structural member of the machine tool, and collecting, the medium having a temperature to be adjusted, from the structural member; and a temperature adjusting device for adjusting a temperature of the medium having a temperature to be adjusted, the method comprising:

a first step of
        measuring a structural-member temperature that is a temperature near a first portion in the structural member, after stopping of a machining operation that causes temperature change of the medium having a temperature to be adjusted, the first portion contributing to the temperature change of the medium having a temperature to be adjusted and being deformed due to the temperature value change of the medium having a temperature to be adjusted,
        measuring a reference temperature that is a temperature of a second portion, in the machine tool, which is not involved in the temperature change of the medium having a temperature to be adjusted, and which is not deformed due to the temperature change of the medium having a temperature to be adjusted, and
        obtaining a temperature change value based on the structural-member temperature and the reference temperature;
    a second step of obtaining an estimated temperature of the first portion based on the temperature change value; and
    a third step of determining, based on the estimated temperature, whether or not at least one of an operation of the temperature adjusting device and an operation of the medium supply and collection device is stopped, or whether or not at least one of an operation of the temperature adjusting device and an operation of the medium supply and collection device is switched from a first mode representing a normal operation to a second mode in which power consumption is less than that in the first mode,
    wherein, in the second step, the estimated temperature is obtained by using: the temperature change value; and a coefficient that is previously obtained such that a time response is the same between the estimated temperature and temperature change of the first portion.

2. The method for controlling the temperature adjustment system of the machine tool according to claim 1, wherein, in the third step, the estimated temperature and a predetermined estimated temperature threshold value are compared with each other, and whether or not at least one of an operation of the temperature adjusting device and an operation of the medium supply and collection device is stopped, or whether or not at least one of an operation of the temperature adjusting device and an operation of the medium supply and collection device is switched from the first mode to the second mode, is determined based on a comparison result.

3. The method for controlling the temperature adjustment system of the machine tool according to claim 2, wherein the estimated temperature threshold value is a function of thermal displacement of the first portion, or temperature change of the first portion after stopping of an operation of the temperature adjusting device and an operation of the medium supply and collection device, and the estimated temperature threshold value is determined according to allowable thermal displacement or allowable temperature change.

4. The method for controlling the temperature adjustment system of the machine tool according to claim 1, wherein the structural member is a rotating device that includes: a rotating portion having a rotating member that rotates about a predetermined axis, and a bearing that pivotally supports the rotating member; and a supporting portion that supports the rotating portion, the medium supply and collection device collects, the medium having a temperature to be adjusted, from a medium flow path provided in the supporting portion or the rotating portion, and the temperature adjusting device adjusts a temperature of the medium having a temperature to be adjusted, and the medium supply and collection device then resupplies, the medium having a temperature to be adjusted, into the medium flow path, the first portion is the rotating portion and the second portion is other than the rotating device, and in the first step, a temperature of a portion of the supporting portion, or a temperature of the medium, having a temperature to be adjusted, in the medium flow path is measured as the structural-member temperature.

5. The method for controlling the temperature adjustment system of the machine tool according to claim 2, wherein the structural member is a rotating device that includes: a rotating portion having a rotating member that rotates about a predetermined axis, and a bearing that pivotally supports the rotating member; and a supporting portion that supports the rotating portion, the medium supply and collection device collects, the medium having a temperature to be adjusted, from a medium flow path provided in the supporting portion or the rotating portion, and the temperature adjusting device adjusts a temperature of the medium having a temperature to be adjusted, and the medium supply and collection device then resupplies, the medium having a temperature to be adjusted, into the medium flow path, the first portion is the rotating portion and the second portion is other than the rotating device, and in the first step, a temperature of a portion of the supporting portion, or a temperature of the medium, having a temperature to be adjusted, in the medium flow path is measured as the structural-member temperature.

6. The method for controlling the temperature adjustment system of the machine tool according to claim 3, wherein the structural member is a rotating device that includes: a rotating portion having a rotating member that rotates about a predetermined axis, and a bearing that pivotally supports the rotating member; and a supporting portion that supports the rotating portion, the medium supply and collection device collects, the medium having a temperature to be adjusted, from a medium flow path provided in the supporting portion or the rotating portion, and the temperature adjusting device adjusts a temperature of the medium having a temperature to be adjusted, and the medium supply and collection device then resupplies, the medium having a temperature to be adjusted, into the medium flow path, the first portion is the rotating portion and the second portion is other than the rotating device, and in the first step, a temperature of a portion of the supporting portion, or a temperature of the medium, having a temperature to be adjusted, in the medium flow path is measured as the structural-member temperature.

7. The method for controlling the temperature adjustment system of the machine tool according to claim 1, wherein the structural member is a table mounted in a machining space of the machine tool, the medium supply and collection device collects, the medium having a temperature to be adjusted, from the machining space, the temperature adjusting device adjusts a temperature of the medium having a temperature to be adjusted, and the medium supply and collection device then resupplies, the medium having a temperature to be adjusted, into the machining space, and the first portion is a part of the table, and the second portion is outside the machining space.

8. The method for controlling the temperature adjustment system of the machine tool according to claim 2, wherein the structural member is a table mounted in a machining space of the machine tool, the medium supply and collection device collects, the medium having a temperature to be adjusted, from the machining space, the temperature adjusting device adjusts a temperature of the medium having a temperature to be adjusted, and the medium supply and collection device then resupplies, the medium having a temperature to be adjusted, into the machining space, and the first portion is a part of the table, and the second portion is outside the machining space.

9. The method for controlling the temperature adjustment system of the machine tool according to claim 3, wherein the structural member is a table mounted in a machining space of the machine tool, the medium supply and collection device collects, the medium having a temperature to be adjusted, from the machining space, the temperature adjusting device adjusts a temperature of the medium having a temperature to be adjusted, and the medium supply and collection device then resupplies, the medium having a temperature to be adjusted, into the machining space, and the first portion is a part of the table, and the second portion is outside the machining space.

10. A method for controlling the temperature adjustment system of a machine tool, the temperature adjustment system including: a medium supply and collection device for supplying, a medium having a temperature to be adjusted, to a structural member of the machine tool, and collecting, the medium having a temperature to be adjusted, from the structural member; and a temperature adjusting device for adjusting a temperature of the medium having a temperature to be adjusted, the method comprising:

a first step of measuring a structural-member temperature that is a temperature near a first portion in the structural member, after stopping of a machining operation that causes temperature change of the medium having a temperature to be adjusted, the first portion contributing to the temperature change of the medium having a temperature to be adjusted and being deformed due to the temperature change of the medium having a temperature to be adjusted, measuring a reference temperature that is a temperature of a second portion, in the machine tool, which is not involved in the temperature change of the medium having a temperature to be adjusted, and which is not deformed due to the temperature change of the medium having a temperature to be adjusted, and obtaining a temperature change value based on the structural-member temperature and the reference temperature;

a second step of obtaining an estimated temperature of the first portion based on the temperature change value; and a third step of determining, based on the estimated temperature, whether or not at least one of an operation of the temperature adjusting device and an operation of the medium supply and collection device is stopped, or whether or not at least one of an operation of the temperature adjusting device and an operation of the medium supply and collection device is switched from a first mode representing a normal operation to a second mode in which power consumption is less than that in the first mode, wherein, in the third step, the estimated temperature and a predetermined estimated temperature threshold value are compared with each other, and whether or not at least one of an operation of the temperature adjusting device and an operation of the medium supply and collection device is stopped, or whether or not at least one of an operation of the temperature adjusting device and an operation of the medium supply and collection device is switched from the first mode to the second mode, is determined based on a comparison result, a preprocessing step of measuring the structural-member temperature and the reference temperature before a machining operation that causes temperature change of the medium having a temperature to be adjusted, obtaining a temperature change value based on the structural-member temperature and the reference temperature, obtaining the estimated temperature of the first portion based on the temperature change value, obtaining a rate of change of the estimated temperature, comparing the rate of change of the estimated temperature with a predetermined rate-of-change threshold value, and updating the estimated temperature threshold value according to a comparison result.

11. The method for controlling the temperature adjustment system of the machine tool according to claim 10, wherein the rate-of-change threshold value is a function of an ambient temperature in an environment in which the machine tool is mounted, and in the preprocessing step, the ambient temperature is measured, and the rate-of-change threshold value is determined based on the ambient temperature.

12. The method for controlling the temperature adjustment system of the machine tool according to claim 10, wherein the structural member is a rotating device that includes: a rotating portion having a rotating member that rotates about a predetermined axis, and a bearing that pivotally supports the rotating member; and a supporting portion that supports the rotating portion, the medium supply and collection device collects, the medium having a temperature to be adjusted, from a medium flow path provided in the supporting portion or the rotating portion, and the temperature adjusting device adjusts a temperature of the medium having a temperature to be adjusted, and the medium supply and collection device then resupplies, the medium having a temperature to be adjusted, into the medium flow path, the first portion is the rotating portion and the second portion is other than the rotating device, and in the first step, a temperature of a portion of the supporting portion, or a temperature of the medium, having a temperature to be adjusted, in the medium flow path is measured as the structural-member temperature.

13. The method for controlling the temperature adjustment system of the machine tool according to claim 11, wherein the structural member is a rotating device that includes: a rotating portion having a rotating member that rotates about a predetermined axis, and a bearing that pivotally supports the rotating member; and a supporting portion that supports the rotating portion, the medium supply and collection device collects, the medium having a temperature to be adjusted, from a medium flow path provided in the supporting portion or the rotating portion, and the temperature adjusting device adjusts a temperature of the medium having a temperature to be adjusted, and the medium supply and collection device then resupplies, the medium having a temperature to be adjusted, into the medium flow path, the first portion is the rotating portion and the second portion is other than the rotating device, and in the first step, a temperature of a portion of the supporting portion, or a temperature of the medium, having a temperature to be adjusted, in the medium flow path is measured as the structural-member temperature.

14. The method for controlling the temperature adjustment system of the machine tool according to claim 10, wherein the structural member is a table mounted in a machining space of the machine tool, the medium supply and collection device collects, the medium having a temperature to be adjusted, from the machining space, the temperature adjusting device adjusts a temperature of the medium having a temperature to be adjusted, and the medium supply and collection device then resupplies, the medium having a temperature to be adjusted, into the machining space, and the first portion is a part of the table, and the second portion is outside the machining space.

15. The method for controlling the temperature adjustment system of the machine tool according to claim 11, wherein the structural member is a table mounted in a machining space of the machine tool, the medium supply and collection device collects, the medium having a temperature to be adjusted, from the machining space, the temperature adjusting device adjusts a temperature of the medium having a temperature to be adjusted, and the medium supply and collection device then resupplies, the medium having a temperature to be adjusted, into the machining space, and the first portion is a part of the table, and the second portion is outside the machining space.

* * * * *